[19] United States Patent
Levy et al.

(10) Patent No.: US 8,396,302 B2
(45) Date of Patent: Mar. 12, 2013

(54) METHOD OF DETECTING LOGOS, TITLES, OR SUB-TITLES IN VIDEO FRAMES (75) Inventors: Avi Levy, Kiryat Tivon (IL); Konstantin Levit-Gurevich, Kiryat Byalik (IL)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 13/004,511

(22) Filed: Jan. 11, 2011

(65) Prior Publication Data

US 2012/0177249 A1    Jul. 12, 2012

(51) Int. Cl.
G06K 9/68    (2006.01)
(52) U.S. Cl. ......... 382/219; 382/181; 382/218; 382/103
(58) Field of Classification Search .................. None
See application file for complete search history.

(56) References Cited

U.S. PATENT DOCUMENTS

| 7,447,907 | B2 * | 11/2008 | Hart et al. ........... 713/176 |
| 7,483,484 | B2 | 1/2009 | Liu et al. |
| 7,911,536 | B2 * | 3/2011 | Dunton ............... 348/556 |
| 8,063,984 | B2 * | 11/2011 | Yamauchi ............ 348/448 |
| 8,144,255 | B2 * | 3/2012 | Hirayama et al. ........ 348/701 |
| 2005/0078223 | A1 | 4/2005 | Liu et al. |
| 2007/0195993 | A1 | 8/2007 | Chen et al. |
| 2010/0166257 | A1 | 7/2010 | Wredenhagen |
| 2010/0259676 | A1 * | 10/2010 | Swan ............... 348/468 |

FOREIGN PATENT DOCUMENTS

WO    2012/096768 A2    7/2012

OTHER PUBLICATIONS

International Search Report and Written Opinion receieved for PCT Patent Application No. PCT/US2011/066338, mailed on Aug. 27, 2012, 9 pages.

* cited by examiner

Primary Examiner — Tom Y Lu
(74) Attorney, Agent, or Firm — Steven Skabrat (57) ABSTRACT

Detecting a static graphic object (such as a logo, title, or sub-title) in a sequence of video frames may be accomplished by analyzing each selected one of a plurality of pixels in a video frame of the sequence of video frames. Basic conditions for the selected pixel may be tested to determine whether the selected pixel is a static pixel. When the selected pixel is a static pixel, a static similarity measure and a forward motion similarity measure may be determined for the selected pixel. A temporal score for the selected pixel may be determined based at least in part on the similarity measures. Finally, a static graphic object decision for the selected pixel may be made based at least in part on the temporal score.

30 Claims, 8 Drawing Sheets

METHOD OF DETECTING LOGOS, TITLES, OR SUB-TITLES IN VIDEO FRAMES

FIELD

The present disclosure generally relates to the field of digital video processing. More particularly, an embodiment of the invention relates to detecting logos, titles, and/or sub-titles in video frames processed by a processing system.

BACKGROUND

It is common for digital video content, such as television (TV), movies, games, videos, etc., to include a logo, a title, or a sub-title. For example, many TV broadcasts include the logo of the broadcasting network or station in a portion of the video frame. In some cases, the logo may be semi-transparent. In other cases, the logo may be solid and not transparent. The logo often remains in the video frames being displayed throughout an entire program, or even continuously for all programs on a network or channel. Similarly, titles and sub-titles may be included in video frames to convey information to the viewer. In some cases, advertising is also included in the video frames in a manner similar to a logo. Logo, title, and sub-title detection is a common task in video editing operations. However, the detection is typically done as part of off-line processing of the video frames in order to remove the logo or to identify advertising segments. Additionally, current techniques for logo detection are inefficient and slow.

BRIEF DESCRIPTION OF THE DRAWINGS

The detailed description is provided with reference to the accompanying figures. The use of the same reference numbers in different figures indicates similar or identical items.

DETAILED DESCRIPTION

Embodiments of the present invention detect a logo, title, or sub-title in a sequence of video frames in real time. Motion fields (forward and/or backward), provided by a video processing application or determined in real time, may be used in determining similarity measures for a given pixel of a video frame. The robust similarity measures combine a correlation of difference vectors and a central gray level difference. A logo score may be determined based on comparing similarity measures relating to static and motion field cases. Embodiments of the present invention may be used for improving frame rate conversion, encoding, and/or other video processing applications. Solid and semi-transparent static graphic object overlays may be detected in video frames based on edge persistency. Embodiments of the present invention can detect fading in and fading out of titles and sub-titles using temporal processing techniques. In an embodiment, detection of these objects is based on the detection of persistent static pixels (e.g., pixels whose 3 pixel×3 pixel neighborhood is similar) in consecutive video frames.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs stored on a computer readable storage medium ("software"), or some combination of hardware and software. For the purposes of this disclosure reference to "logic" shall mean either hardware, software (including for example micro-code that controls the operations of a processor), firmware, or some combination thereof.

Generally, there are three main difficulties in detecting graphic overlays in video frames. First, in semi-transparent objects, pixel neighborhoods do not have similar gray level values, even in two consecutive frames due to the background layer that may change from frame to frame. Second, in fading (in or out) titles there is a gradual change in the pixel neighborhoods gray level values. Third, static object pixels that are not part of a logo or titles may be improperly detected as part of graphics overlays.

Embodiments of the present invention use innovative approaches to overcome these difficulties. Edges of static graphic objects may be detected and then filled using morphological operations. These operations are based on the fact that strong edges should be present even in the case of semi-transparent logo borders. Temporal filtering of the logo detection indications may be performed, which produces decision stability together with sensitivity to gradual changes in the object's appearance over a sequence of frames. Motion estimation field (or fields) may be used as input data in order to distinguish between static and moving regions.

Figure 1:
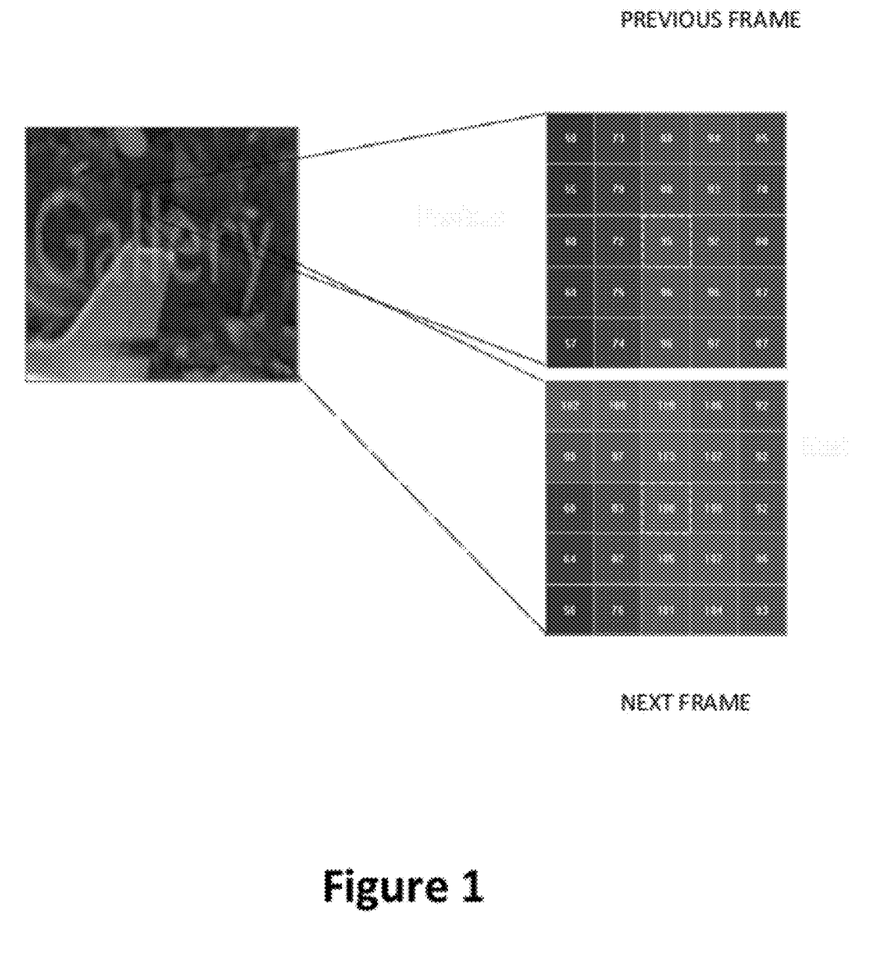
FIG. 1 is a diagram of an example logo in a video frame, and gray level values of portions of previous and next video frames in accordance with some embodiments of the invention.

FIG. 1 is a diagram of an example logo in a portion of a video frame, and gray level values of portions of previous and next video frames in accordance with some embodiments of the invention. In the example shown, a logo called "Gallery" is semi-transparent in the video frame portion. Each pixel of each frame has a gray level value. For example, the gray level value of the center pixel of a portion of the previous frame of the video frame sequence is 95, and the gray level value of the center pixel of that portion in the next frame of the sequence is 108. The gray level values of neighboring pixels in this example are as shown. When the gray level values of neighboring pixels are sufficiently different, this implies that there is an edge at the current pixel. If the pixel belongs to a semi-transparent logo, the gray level values of the pixel typically change from frame to frame. Embodiments of the present invention operate on gray level values of pixels.

YUV is a color space typically used as part of a color image pipeline. It encodes a color image or video taking human perception into account, allowing reduced bandwidth for chrominance components, thereby typically enabling transmission errors or compression artifacts to be more efficiently masked by the human perception than using a "direct" RGBrepresentation. The YUV model defines a color space in terms of one luma (Y) and two chrominance (UV) components. In video, luma represents the brightness of an image (the achromatic portion of the image). In an embodiment, Y values may be between 0 and 255. As evidenced by the example of FIG. 1, in a semi-transparent logo, the gray level values in a pixel neighborhood change from frame to frame. However, the presence of a significant edge does persist. This can be seen by comparing the gray level values of pixels in the second column adjacent to the center pixel in each of the previous and next frames.

Embodiments of the present invention comprise a real-time logo detection process operating on at least two video frames at a time. The logo detection process stores the results of processing iterations in memory buffers within a processing system, and updates these memory buffers during each iteration. Embodiments of the present invention may be applied to each pixel in each frame of a sequence of video frames.

After processing all pixels in a selected sequence of frames, an indication of which pixels in the frames comprise part of a logo, title, or sub-title may be output for further processing by a frame rate conversion, encoding, or other video processing function. In an embodiment, this indication comprises an array of Boolean values, where when the value in an array element is true (or 1), the pixel in the frame represented by that array element is determined to be in a logo, title, or sub-title.

For each iteration, in an embodiment the logo detection process receives the following inputs:

p—the pixel currently being processed at location (x, y) in a video frame.

$Y_{prev}$—the $Y_{prev}$ surface comprises a two dimensional (2D) array of gray level values for pixels in at least a portion of the previous frame.

$Y_{next}$—the $Y_{next}$ surface comprises a 2D array of gray level values for pixels in at least a portion of the next frame.

MVf—The MVf comprises a 2D array forward motion field describing the motion of each pixel between the current frame and the next frame.

MVb—The MVb comprises a 2D array forward motion field describing the motion of each pixel between the previous frame and the current frame.

The following notations are used herein:

p—pixel location.

$Y_{prev}(p)$—the gray level value in the previous frame of the pixel at location p.

$Y_{next}(P)$—the gray level value in the next frame of the pixel at location p.

MVf(p)—forward motion vector at location p.

MVb(p)—backward motion vector at location p.

Figure 2:
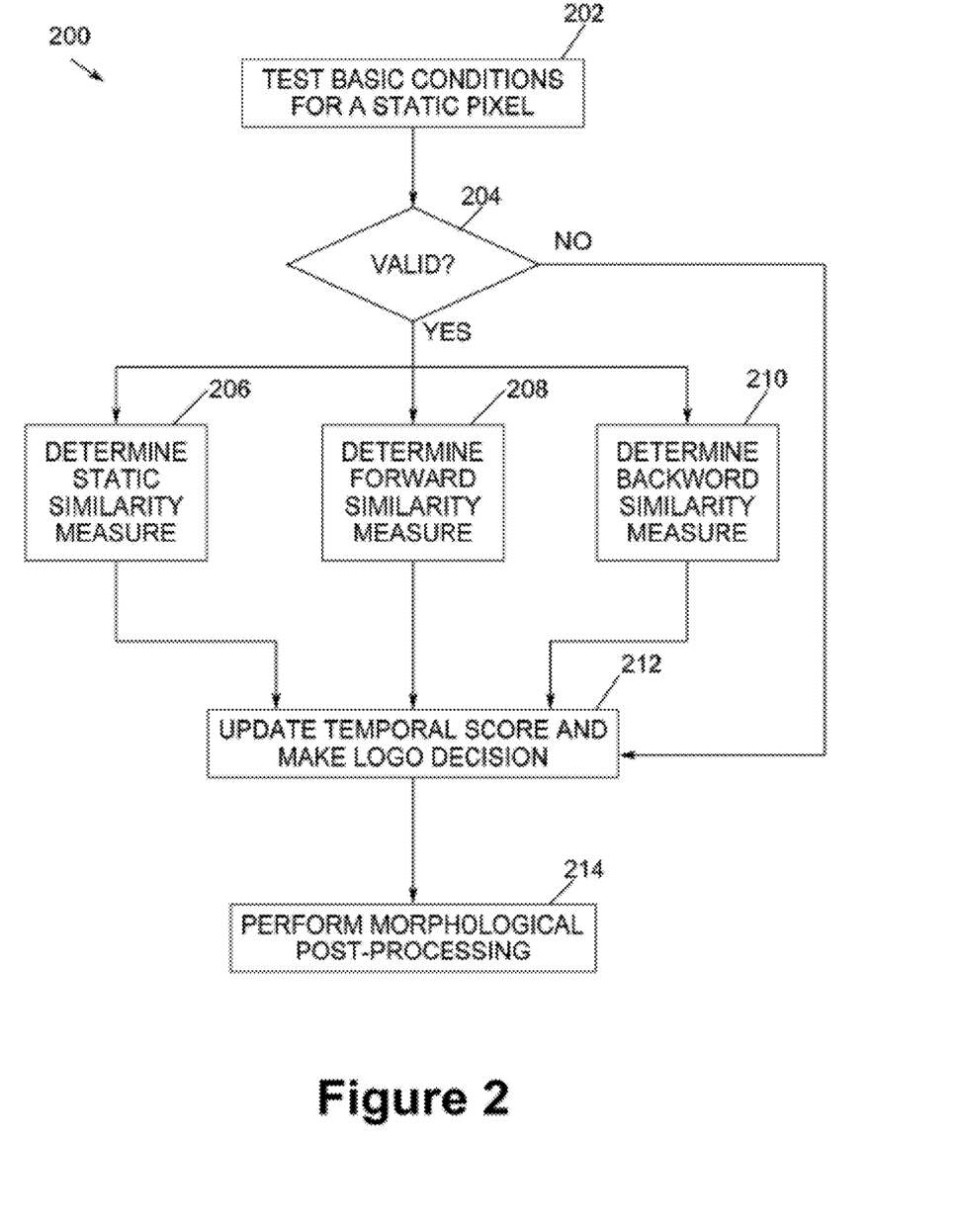
FIG. 2 illustrates a flow diagram of logo detection processing according to an embodiment of the present invention.

FIG. 2 illustrates a flow diagram of logo detection processing 200 for each pixel according to an embodiment of the present invention. First, at block 202, basic conditions for a static pixel may be tested. If the basic conditions for a static pixel are not valid at block 204, processing continues with block 212. If the basic conditions for the static pixel are valid, one or more similarity measures may be determined for each of the static and non-static cases for the pixel. In an embodiment, up to three similarity measures may be determined. At block 206, a static similarity measure may be determined. At block 208, a forward similarity measure may be determined. At block 210, a backward similarity measure may be determined. In some embodiments, determining the backward similarity measure may be optional. At block 212, the temporal score for the pixel is then updated and a logo decision for that pixel may be made. Finally, at block 214, morphological post processing may be performed. In an embodiment, the resulting output comprises an indication as to whether the pixel is determined to be in a logo, title, or sub-title in the frame. In an embodiment, testing of the basic conditions for a pixel at block 202 comprises two parts. The first part is to determine a temporal difference condition:

$(|Y_{prev}(p) - Y_{next}(p)| < C_t)$, where $C_t$ is a constant.

If the absolute value of the change in gray level value for pixel p between the previous frame and the next frame is less than a threshold level, then the first basic condition for the pixel is valid, and similarity measures will be determined. If the absolute value of the change in gray level value for pixel p between the previous frame and the next frame is more than or equal to a threshold level, then the first basic condition for the pixel is not valid. This means that the pixel will get a low logo score.

The second part is to determine a smoothness of the pixel's motion. In an embodiment, this may be determined by:

$$\sum_{i,j} |Y(p + (i, j)) - Y(p)| > C_s,$$

where $C_s$ is a constant.

That is, looking at a neighborhood of pixels around pixel p, if p is near an edge, then the change in gray level values is relatively large (as determined by the constant $C_s$). If the change is relatively large, similarity measures will be determined. If the change is relatively small, then similarity measures will not be determined and the pixel will get a low logo score.

A similarity measure may be determined for the static case (e.g., the pixel value didn't change between frames) and also for the displacements indicated by the forward and backward motion fields.

The static case (block 206): match the 3 pixel×3 pixel neighborhood regions in $Y_{prev}$ and in $Y_{next}$ at center location p.

The forward motion case (block 208): match the 3 pixel×3 pixel neighborhood regions in $Y_{prev}$ at center location p and in $Y_{next}$ at center location $p+MV_f(p)$.

The backward motion case (block 210): match the 3 pixel×3 pixel neighborhood regions in $Y_{prev}$ at center location $p+MV_b(p)$ and $Y_{next}$ at center location p.

To simplify the notation herein, the two regions are denoted $Y_a(p)$ and $Y_b(q)$ for the above three cases, and a constant called "Edge" is defined that equals the gray level difference of a typical logo edge. The notation "a" and "b" refer to the two regions in different frames being compared for pixels p and q, respectively. The corresponding similarity measures are denoted $SM_s$, $SM_f$, and $SM_b$. Table 1 shows the two regions being compared for each case.

TABLE 1

| Similarity Measure Regions | $Y_a(p)$ | $Y_b(q)$ |
|---|---|---|
| Static Case ($SM_s$) | $Y_{prev}(p)$ | $Y_{next}(p)$ |
| Forward Motion Case ($SM_f$) | $Y_{prev}(p)$ | $Y_{next}(p + MV_f(p))$ |
| Backward Motion Case ($SM_b$) | $Y_{prev}(p + MV_b(p))$ | $Y_{next}(p)$ |

Figure 3:
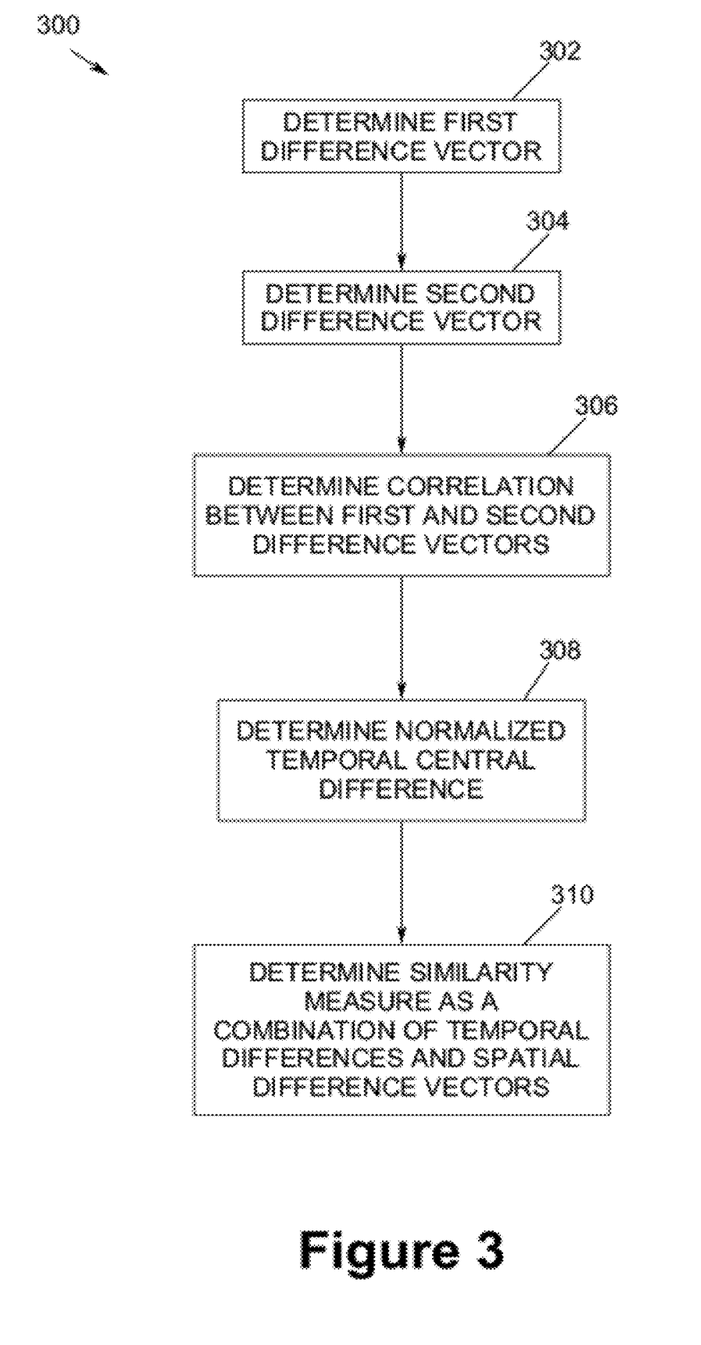
FIG. 3 is a flow diagram of determining a similarity measure according to an embodiment of the present invention.

FIG. 3 is a flow diagram of determining a similarity measure according to an embodiment of the present invention. In an embodiment, the process shown in FIG. 3 may be performed for each pixel in a frame for each of the three cases shown in Table 1. That is, $SM_{ab}$ is $SM_s$ for the static case when $a=Y_{prev}(p)$ and $b=Y_{next}(p)$; $SM_{ab}$ is $SM_f$ for the forward motion case when a=$Y_{prev}$(P) and b=$Y_{next}$(p+$MV_f$(p)); and $SM_{ab}$ is $SM_b$ for the backward motion case when a=$Y_{prev}$(p+$MV_b$(p)) and b=$Y_{next}$(p). In an embodiment, the backward motion case may be omitted. At block 302, a first difference vector may be determined of the differences between 3×3 blocks regarding the center pixels. This difference vector may be denoted $DV_a$. In an embodiment, difference vector $DV_a$ may be determined according to the pseudo-code shown in Table 2.

TABLE 2

```
For i = (-1,0,1), For j = (-1,0,1)
    DV_a(i,j) = Y_a(p) - Y_a(p+(i,j))
    If DV_a(i,j) < -Edge then DV_a(i,j) = -1.
    If DV_a(i,j) > Edge then DV_a(i,j) = 1.
    Else DV_a(I,j) = 0.
End for
```

At block 304, a second difference vector may be determined. This difference vector may be denoted $DV_b$. In an embodiment, difference vector $DV_b$ may be determined in a similar manner according to the pseudo-code shown in Table 3.

TABLE 3

```
For i = (-1,0,1), For j = (-1,0,1)
    DV_b(i,j) = Y_b(q) - Y_b(q+(i,j))
    If DV_b(i,j) < -Edge then DV_b(i,j) = -1.
    If DV_b(i,j) > Edge then DV_b(i,j) = 1.
    Else DV_b(I,j) = 0.
End for
```

The difference vectors store the differences of the respective gray level values represented as signs for the eight neighboring pixels of p and q. At block 306, a correlation between the first and second difference vectors may be determined by computing the correlation (CR) between $DV_a$ and $DV_b$ as:

$CR = (1/8) \Sigma DVa_i * DVb_i$.

The correlation is a scalar product of the two difference vectors, normalized by dividing by the number of neighboring pixels (e.g., 8). At block 308, a normalized temporal central difference of gray level values for pixels p and q (each from a different frame) may be determined as:

$TD = \max((|Y_a(p)-Y_b(q)|/K*Edge), 0)$, where K is a constant.

At block 310, a similarity measure may be determined as a combination of the temporal differences and spatial difference vectors as:

$SM_{ab} = A*(1-TD)+(1-A)*CR$, where $0 < A < 1$.

To summarize, the processing of FIG. 3 may be performed for the static case, the forward motion case, and optionally, the backward motion case for each pair of pixels. The similarity measures may be used to determine a current score for each pixel as discussed below.

Figure 4:
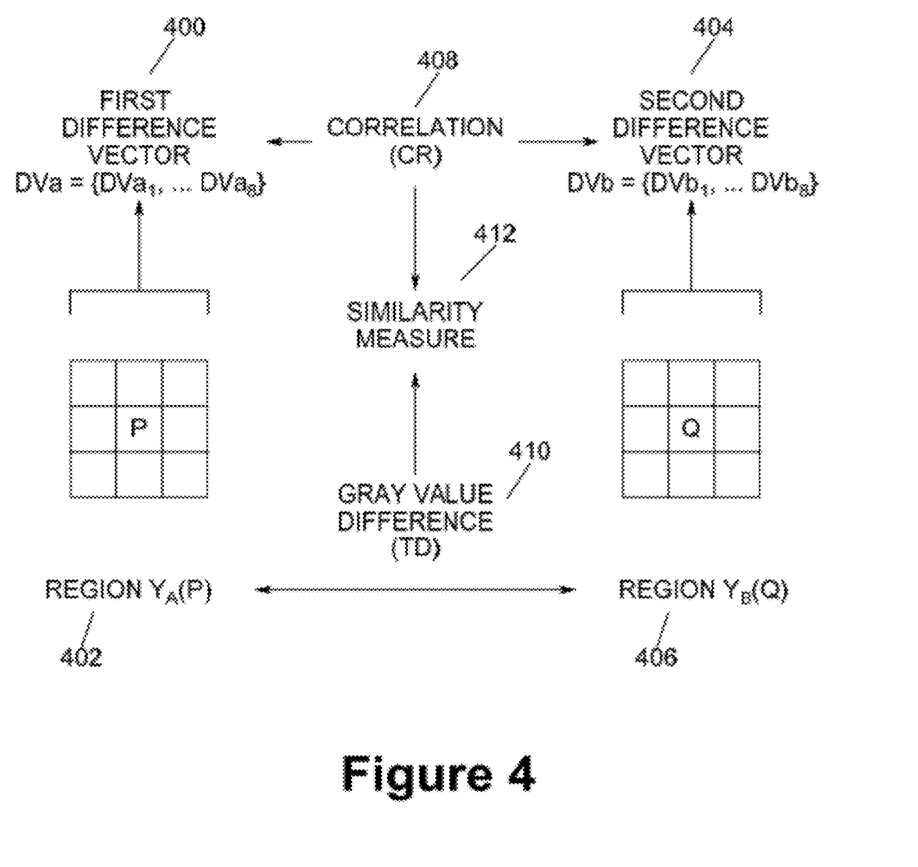
FIG. 4 is a diagram illustrating a relationship between a correlation between two difference vectors and a central gray level difference according to an embodiment of the present invention.

FIG. 4 is a diagram illustrating a relationship between a correlation between the two difference vectors and a central gray value difference according to an embodiment of the present invention. First difference vector $DV_a$ 400 was determined by analyzing neighboring pixels of pixel p in region $Y_a$(p) 402. Second difference vector $DV_b$ 404 was determined by analyzing neighboring pixels of pixel q in region $Y_b$(q) 406. The correlation CR 408 was determined, and the gray value difference TD 410 was determined. Finally, similarity measure 412 was generated as a combination of the correlation and the gray value difference.

Figure 5:
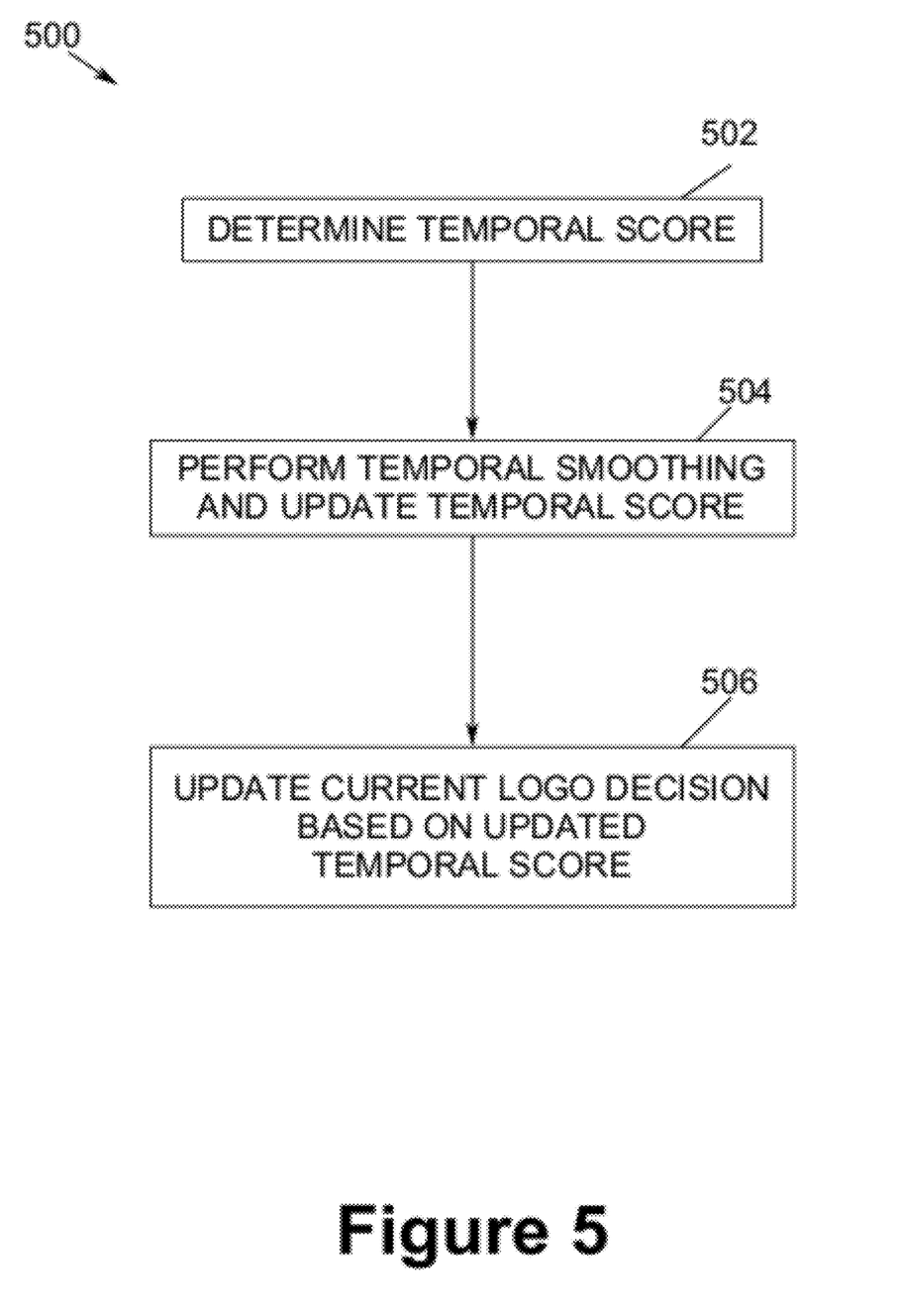
FIG. 5 is a flow diagram of updating a temporal score for a pixel according to an embodiment of the present invention.

After the similarity measures have been determined for the pixel at blocks 206, 208, and 210 of FIG. 3, a temporal score may be updated and a logo decision made for the pixel as shown at block 212 of FIG. 3. FIG. 5 is a flow diagram of updating a temporal score for a pixel according to an embodiment of the present invention. At block 502, the temporal score for the pixel may be determined. In an embodiment, the temporal score may be determined as:

If the basic conditions are not satisfied then

Score=$-BC$(where BC is a constant)

Else

Score=$SM_s-(SM_f+SM_b)/2$.

Note that if only the forward motion field is available, then the score in the Else case is Score=$SM_s-SM_f$. At block 504, temporal smoothing may be performed and the temporal score may be updated. In an embodiment, this may be accomplished for pixel p by:

Logo_$f(p)=W*$Logo_$f(p)+(1-W)*$Score, where
$0<W<1$ and Logo_$f$ is a temporal score array.

Temporal score array Logo_f comprises an array having an element representing each pixel in a frame. The temporal score array stores a "logo score" for pixels of the frame. The temporal score may be updated at each iteration and may be computed as a weighted sum of the previous score and the current score. At block 506, the current logo decision for pixel p may be updated based on the updated temporal score. In an embodiment, this may be accomplished for pixel p by:

If (Logo_$bmp(p)$==0)AND(Logo_$f(p)$>High_Logo_Threshold) then Logo_$bmp(p)$=1

If (Logo_$bmp(p)$==1)AND(Logo_$f(p)$<Low_Logo_Threshold then Logo_$bmp(p)$=0;

wherein Logo_bmp is a logical array with each element storing a 1 indicating logo/title/sub-title pixels or a 0 otherwise, and High_Logo_Threshold and Low_Logo_Threshold are constants.

If for some pixel p, the logo_f(p) is larger than the predetermined threshold High_Logo_Threshold, then pixel p is decided to be part of a logo, title, or sub-title. If logo_f(p) is less than the predetermined threshold Low_Logo_Threshold, then pixel p is decided to not be part of a logo, title, or sub-title. The array Logo_bmp stores Boolean values indicating whether pixels in a frame are part of a logo, title, or sub-title. By using the thresholds as shown, embodiments of the present invention handle the case of a logo, title, or sub-title fading in or fading out across multiple frames.

At block 214 of FIG. 3, morphological post processing may be performed. The morphological operation fills the holes in the identified logo regions and removes isolated logo detection pixels (which are usually errors in detecting logo pixels). In an embodiment, a morphological filter for this purpose can be described by the following procedure:

Count the number N of 1's (logo pixel indications) in Logo_bmp in a neighborhood of location p.

If $N<N_L$ set Logo_$bmp(p)$ to 0, where $N_L$ is a constant.

If $N>N_H$ set Logo_$bm(p)$ to 1, where $N_H$ is a constant (bigger than $N_L$).

In at least one embodiment, the output of the logo detection process comprises the logical array Logo_bmp for the frame being processed. In an embodiment, the logo detection process may save Logo_bmp for each frame in the sequence of video frames. The information regarding where the logos, titles, or sub-titles are in the video frames may be used for performing various video processing operations. In an embodiment, logos may be deleted from the video frame sequence prior to displaying the video frames on a display monitor for viewing by a viewer.

Figure 6:
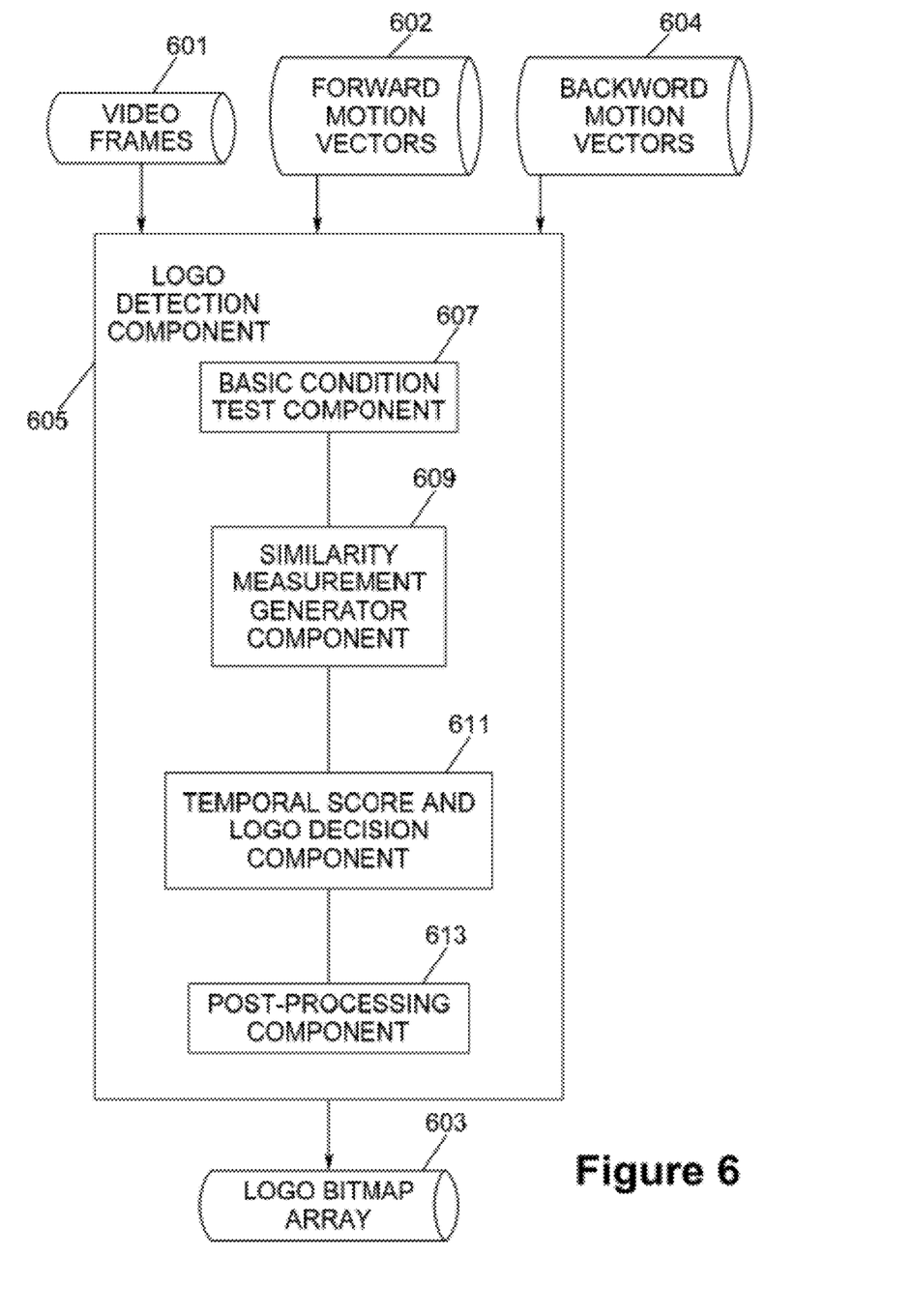
FIG. 6 is a block diagram of logo detection components according to an embodiment of the present invention.

FIG. 6 is a block diagram of logo detection components according to an embodiment of the present invention. Video frames 601, forward motion vectors 602, and backward motion vectors 604 may be input to logo detection component 605 to produce logo bitmap array 603. In an embodiment, logo detection component may be implemented in circuitry within a processing system. Logo detection component 605 comprises basic condition test component 607 to test static pixels for basic conditions, similarity measure generator component 609 to generate similarity measures, temporal score and logo decision component 611 to determine temporal scores and make logo decisions, and post-processing component 613 to perform morphological post-processing operations. Logo bitmap array 603 may be used for other video processing operations by a processing system.

Figure 7:
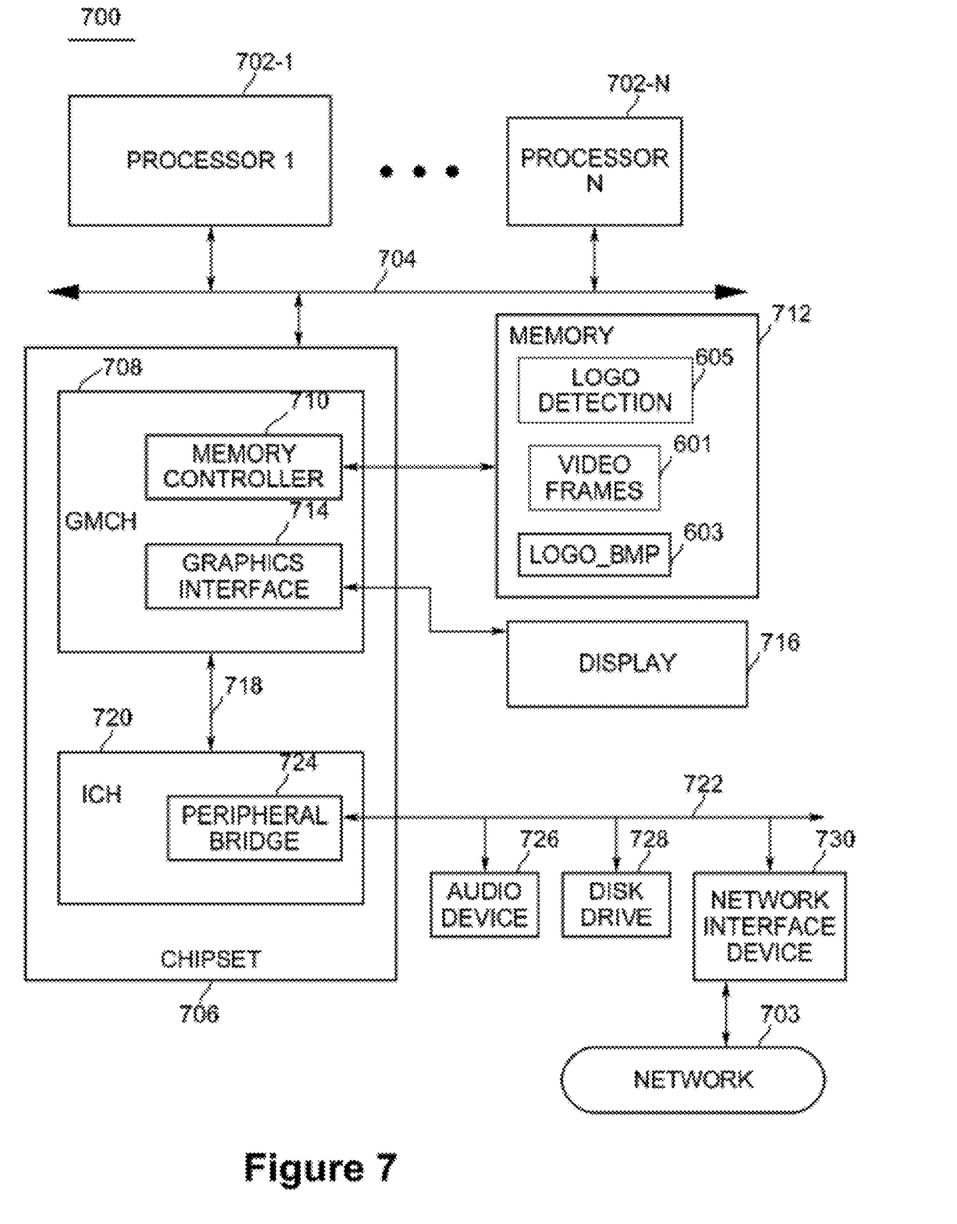
FIGS. 7 and 8 illustrate block diagrams of embodiments of processing systems, which may be utilized to implement some embodiments discussed herein.

FIG. 7 illustrates a block diagram of an embodiment of a processing system 700. In various embodiments, one or more of the components of the system 700 may be provided in various electronic devices capable of performing one or more of the operations discussed herein with reference to some embodiments of the invention. For example, one or more of the components of the system 700 may be used to perform the operations discussed with reference to FIGS. 1-6, e.g., by processing instructions, executing subroutines, etc. in accordance with the operations discussed herein. Also, various storage devices discussed herein (e.g., with reference to FIG. 7 and/or FIG. 8) may be used to store data, operation results, etc. In one embodiment, data (such as video frames 601) received over the network 703 (e.g., via network interface devices 730 and/or 830) may be stored in caches (e.g., L1 caches in an embodiment) present in processors 702 (and/or 802 of FIG. 8). These processors may then apply the operations discussed herein in accordance with various embodiments of the invention.

More particularly, the computing system 700 may include one or more central processing unit(s) (CPUs) 702 or processors that communicate via an interconnection network (or bus) 704. Hence, various operations discussed herein may be performed by a processor in some embodiments. Moreover, the processors 702 may include a general purpose processor, a network processor (that processes data communicated over a computer network 703, or other types of a processor (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors. Moreover, the operations discussed with reference to FIGS. 1-6 may be performed by one or more components of the system 700. In an embodiment, a processor (such as processor 1 702-1) may comprise Logo Detection 605 as hardwired logic (e.g., circuitry) or microcode.

A chipset 706 may also communicate with the interconnection network 704. The chipset 706 may include a graphics and memory control hub (GMCH) 708. The GMCH 708 may include a memory controller 710 that communicates with a memory 712. The memory 712 may store data, such as video frames 601. The data may include sequences of instructions that are executed by the processor 702 or any other device included in the computing system 700. Furthermore, memory 712 may store one or more of the programs or algorithms discussed herein such as Logo Detection 605, Logo Bitmap Array (Logo_bmp) 603, instructions corresponding to executables, mappings, etc. The same or at least a portion of this data (including instructions, video frames, Logo Bitmap Arrays, and temporary storage arrays) may be stored in disk drive 728 and/or one or more caches within processors 702. In one embodiment of the invention, the memory 712 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processors and/or multiple system memories.

The GMCH 708 may also include a graphics interface 714 that communicates with a display 716. In one embodiment of the invention, the graphics interface 714 may communicate with the display 716 via an accelerated graphics port (AGP). In an embodiment of the invention, the display 716 may be a flat panel display that communicates with the graphics interface 714 through, for example, a signal converter that translates a digital representation of an image stored in a storage device such as video memory or system memory into display signals that are interpreted and displayed by the display 716. The display signals produced by the interface 714 may pass through various control devices before being interpreted by and subsequently displayed on the display 716. In an embodiment, Logo Detection 605 may be implemented as circuitry within graphics interface 714 or elsewhere within the chipset. In an embodiment, video frames processed by Logo Detection 605 may be shown on the display.

A hub interface 718 may allow the GMCH 708 and an input/output (I/O) control hub (ICH) 720 to communicate. The ICH 720 may provide an interface to I/O devices that communicate with the computing system 700. The ICH 720 may communicate with a bus 722 through a peripheral bridge (or controller) 724, such as a peripheral component interconnect (PCI) bridge, a universal serial bus (USB) controller, or other types of peripheral bridges or controllers. The bridge 724 may provide a data path between the processor 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 722 may communicate with an audio device 726, one or more disk drive(s) 728, and a network interface device 730, which may be in communication with the computer network 703 (such as the Internet, for example). In an embodiment, the device 730 may be a network interface controller (NIC) capable of wired or wireless communication. Other devices may communicate via the bus 722. Also, various components (such as the network interface device 730) may communicate with the GMCH 708 in some embodiments of the invention. In addition, the processor 702, the GMCH 708, and/or the graphics interface 714 may be combined to form a single chip. In an embodiment, video frames 601 may be received from computer network 703.

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In an embodiment, components of the system 700 may be arranged in a point-to-point (PtP) configuration such as discussed with reference to FIG. 8. For example, processors, memory, and/or input/output devices may be interconnected by a number of point-to-point interfaces.

Figure 8:
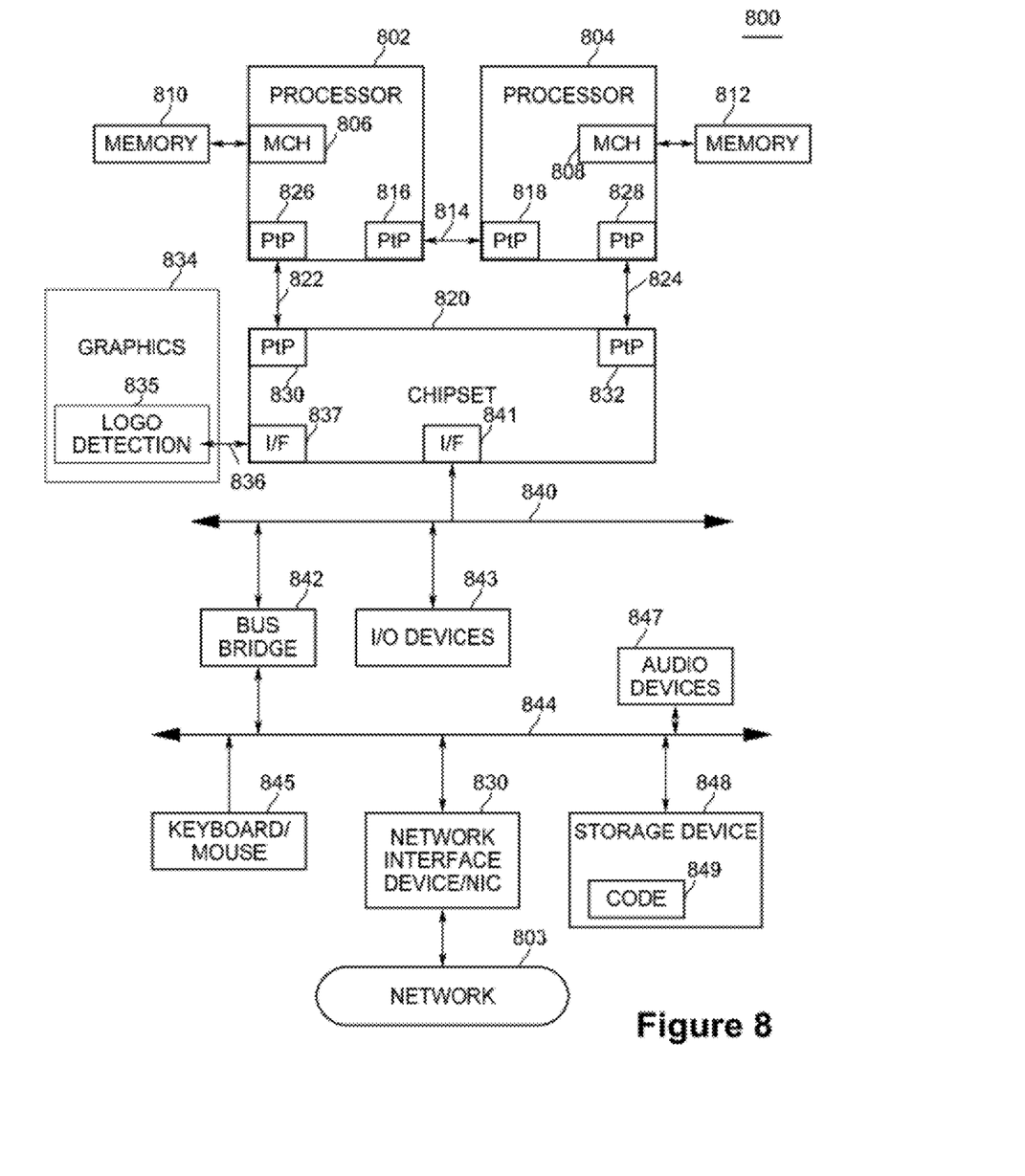

More specifically, FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-6 may be performed by one or more components of the system 800.

As illustrated in FIG. 8, the system 800 may include multiple processors, of which only two, processors 802 and 804 are shown for clarity. The processors 802 and 804 may each include a local memory controller hub (MCH) 806 and 808 (which may be the same or similar to the GMCH 708 of FIG. 7 in some embodiments) to couple with memories 810 and 812. The memories 810 and/or 812 may store various data such as those discussed with reference to the memory 712 of FIG. 7.

The processors 802 and 804 may be any suitable processor such as those discussed with reference to processors 702 of FIG. 7. The processors 802 and 804 may exchange data via a point-to-point (PtP) interface 814 using PtP interface circuits 816 and 818, respectively. The processors 802 and 804 may each exchange data with a chipset 820 via individual PtP interfaces 822 and 824 using point to point interface circuits 826, 828, 830, and 832. The chipset 820 may also exchange data with a high-performance graphics circuit 834 via a high-performance graphics interface 836, using a PtP interface circuit 837.

At least one embodiment of the invention may be provided by utilizing the processors 802 and 804. For example, the processors 802 and/or 804 may perform one or more of the operations of FIGS. 1-6. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8. At least one embodiment of the present invention for logo detection processing may be provided within Logo Detection component 835 of graphics circuitry 836.

The chipset 820 may be coupled to a bus 840 using a PtP interface circuit 841. The bus 840 may have one or more devices coupled to it, such as a bus bridge 842 and I/O devices 843. Via a bus 844, the bus bridge 843 may be coupled to other devices such as a keyboard/mouse 845, the network interface device 830 discussed with reference to FIG. 7 (such as modems, network interface cards (NICs), or the like that may be coupled to the computer network 703), audio I/O device 847, and/or a data storage device 848. The data storage device 848 may store, in an embodiment, Logo Detection code 749 that may be executed by the processors 802 and/or 804.

In various embodiments of the invention, the operations discussed herein, e.g., with reference to FIGS. 1-8, may be implemented as hardware (e.g., logic circuitry), software (including, for example, micro-code that controls the operations of a processor such as the processors discussed with reference to FIGS. 7 and 8), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method of detecting a static graphic object in a sequence of video frames in real time comprising:
   for each selected one of a plurality of pixels in a video frame of the sequence of video frames,
   testing conditions for the selected pixel to determine whether the selected pixel is a static pixel;
   when the selected pixel is a static pixel, determining a static similarity measure and a forward motion similarity measure for the selected pixel;
   determining a temporal score for the selected pixel based at least in part on the similarity measures; and
   making a static graphic object decision for the selected pixel based at least in part on the temporal score; and
   performing a video processing operation on the sequence of video frames based at least in part on the static graphic object decisions for the plurality of pixels.

2. The method of claim 1, further comprising performing morphological post-processing operations to fill holes in regions of video frames identified by the static graphic object decisions as static graphic objects and to remove isolated static graphic object detection pixels.

3. The method of claim 1, further comprising determining a backward motion similarity measure for the selected pixel when the selected pixel is a static pixel.

4. The method of claim 1, wherein the static graphic object is semi-transparent.

5. The method of claim 1, wherein the static graphic object comprises one of a logo, title, or sub-title in a video frame.

6. The method of claim 5, wherein the static graphic object at least one of fades in and fades out of the sequence of video frames.

7. The method of claim 1, wherein testing conditions comprises:
determining a temporal difference condition of a gray level value for the selected pixel between a first video frame and a second video frame; and
determining a smoothness of the selected pixel's motion between the first and second video frames.

8. The method of claim 1, wherein determining at least one of the static similarity measure and the forward motion similarity measure comprises:
determining a first difference vector storing differences of gray level values of neighboring pixels from the selected pixel in a first video frame;
determining a second difference vector storing differences of gray level values of neighboring pixels from the selected pixel in a second video frame;
determining a correlation between the first and second difference vectors;
determining a normalized temporal central difference of the gray level values for the selected pixel in the first and second video frames; and
determining the similarity measure as a combination of the correlation and the normalized temporal central difference.

9. The method of claim 1, further comprising updating the temporal score by performing temporal smoothing of the selected pixel's temporal score, the temporal score comprising a weighted sum of the previous temporal score and the current temporal score for the selected pixel.

10. The method of claim 1, wherein making the static graphic object decision for the selected pixel based at least in part on the temporal score comprises determining if the static graphic object decision for the selected pixel is false and the temporal score for the selected pixel is greater than a selected high threshold, then setting the static graphic object decision to true; and if the static graphic object decision for the selected pixel is true and the temporal score for the selected pixel is less than a selected low threshold, then setting the static graphic object decision to false.

11. A computer-readable medium comprising one or more instructions that when executed on a processor of a processing system perform one or more operations to detect a static graphic object in a sequence of video frames in real time by
for each selected one of a plurality of pixels in a video frame of the sequence of video frames,
testing conditions for the selected pixel to determine whether the selected pixel is a static pixel;
when the selected pixel is a static pixel, determining a static similarity measure and a forward motion similarity measure for the selected pixel;
determining a temporal score for the selected pixel based at least in part on the similarity measures; and
making a static graphic object decision for the selected pixel based at least in part on the temporal score; and
performing a video processing operation on the sequence of video frames based at least in part on the static graphic object decisions for the plurality of pixels.

12. The computer-readable medium of claim 11, further comprising instructions to perform morphological post-processing operations to fill holes in regions of video frames identified by the static graphic object decisions as static graphic objects and to remove isolated static graphic object detection pixels.

13. The computer-readable medium of claim 11, further comprising instructions to determine a backward motion similarity measure for the selected pixel when the selected pixel is a static pixel.

14. The computer-readable medium of claim 11, wherein the static graphic object is semi-transparent.

15. The computer-readable medium of claim 11, wherein the static graphic object comprises one of a logo, title, or sub-title in a video frame.

16. The computer-readable medium of claim 15, wherein the static graphic object at least one of fades in and fades out of the sequence of video frames.

17. The computer-readable medium of claim 11, wherein instructions to test conditions comprise instructions to
determine a temporal difference condition of a gray level value for the selected pixel between a first video frame and a second video frame; and
determine a smoothness of the selected pixel's motion between the first and second video frames.

18. The computer-readable medium of claim 11, wherein instructions to determine at least one of the static similarity measure and the forward motion similarity measure comprise instructions to
determine a first difference vector storing differences of gray level values of neighboring pixels from the selected pixel in a first video frame;
determine a second difference vector storing differences of gray level values of neighboring pixels from the selected pixel in a second video frame;
determine a correlation between the first and second difference vectors;
determine a normalized temporal central difference of the gray level values for the selected pixel in the first and second video frames; and
determine the similarity measure as a combination of the correlation and the normalized temporal central difference.

19. The computer-readable medium of claim 11, further comprising instructions to update the temporal score by performing temporal smoothing of the selected pixel's temporal score, the temporal score comprising a weighted sum of the previous temporal score and the current temporal score for the selected pixel.

20. The computer-readable medium of claim 11, wherein instructions to make the static graphic object decision for the selected pixel based at least in part on the temporal score comprise instructions to determine if the static graphic object decision for the selected pixel is false and the temporal score for the selected pixel is greater than a selected high threshold, then setting the static graphic object decision to true; and if the static graphic object decision for the selected pixel is true and the temporal score for the selected pixel is less than a selected low threshold, then setting the static graphic object decision to false.

21. A processing system for detecting a static graphic object in a sequence of video frames in real time by analyzing each selected one of a plurality of pixels in a video frame of the sequence of video frames, comprising:
a conditions test component to test conditions for the selected pixel to determine whether the selected pixel is a static pixel;
a similarity measurement generator component coupled to the conditions test component to determine a static similarity measure and a forward motion similarity measure for the selected pixel when the selected pixel is a static pixel; and a temporal score and static graphic object detection component coupled to the similarity measurement generator component to determine a temporal score for the selected pixel based at least in part on the similarity measures; and to make a static graphic object decision for the selected pixel based at least in part on the temporal score.

22. The processing system of claim 21, further comprising a post-processing component to perform morphological post-processing operations to fill holes in regions of video frames identified by the static graphic object decisions as static graphic objects and to remove isolated static graphic object detection pixels.

23. The processing of claim 21, further wherein the similarity measurement generator component is adapted to determine a backward motion similarity measure for the selected pixel when the selected pixel is a static pixel.

24. The processing system of claim 21, wherein the static graphic object is semi-transparent.

25. The processing system of claim 21, wherein the static graphic object comprises one of a logo, title, or sub-title in a video frame.

26. The processing system of claim 25, wherein the static graphic object at least one of fades in and fades out of the sequence of video frames.

27. The processing system of claim 21, wherein the conditions test component is adapted to determine a temporal difference condition of a gray level value for the selected pixel between a first video frame and a second video frame; and determine a smoothness of the selected pixel's motion between the first and second video frames.

28. The processing system of claim 21, wherein the similarity measurement generator component is adapted to determine a first difference vector storing differences of gray level values of neighboring pixels from the selected pixel in a first video frame;

determine a second difference vector storing differences of gray level values of neighboring pixels from the selected pixel in a second video frame;

determine a correlation between the first and second difference vectors;

determine a normalized temporal central difference of the gray level values for the selected pixel in the first and second video frames; and determine the similarity measure as a combination of the correlation and the normalized temporal central difference.

29. The processing system of claim 21, wherein the temporal score and static graphic object decision component is adapted to update the temporal score by performing temporal smoothing of the selected pixel's temporal score, the temporal score comprising a weighted sum of the previous temporal score and the current temporal score for the selected pixel.

30. The processing system of claim 21, wherein the temporal score and static graphic object decision component is adapted to determine if the static graphic object decision for the selected pixel is false and the temporal score for the selected pixel is greater than a selected high threshold, then set the static graphic object decision to true; and if the static graphic object decision for the selected pixel is true and the temporal score for the selected pixel is less than a selected low threshold, then set the static graphic object decision to false.

* * * * *